United States Patent
Hammacher

(10) Patent No.: US 9,993,014 B2
(45) Date of Patent: Jun. 12, 2018

(54) METHOD AND DEVICE FOR SEPARATING SHEET-SHAPED OBJECTS INTO STRIP-SHAPED OR SLAB-SHAPED OBJECT SUB-UNITS

(75) Inventor: Heinz-Peter Hammacher, Bamberg (DE)

(73) Assignee: LOESCH VERPACKUNGSTECHNIK GMBH, Altendorf (DE)

( * ) Notice: Subject to any disclaimer, the term of this patent is extended or adjusted under 35 U.S.C. 154(b) by 676 days.

(21) Appl. No.: 14/356,123

(22) PCT Filed: Nov. 11, 2011

(86) PCT No.: PCT/EP2011/069971
§ 371 (c)(1),
(2), (4) Date: May 2, 2014

(87) PCT Pub. No.: WO2013/068050
PCT Pub. Date: May 16, 2013

(65) Prior Publication Data
US 2014/0271986 A1 Sep. 18, 2014

(51) Int. Cl.
*A23G 4/02* (2006.01)
*B26D 7/32* (2006.01)
(Continued)

(52) U.S. Cl.
CPC .............. *A23G 4/02* (2013.01); *A23G 4/00* (2013.01); *A23G 7/0068* (2013.01); *B26D 7/32* (2013.01);
(Continued)

(58) Field of Classification Search
CPC .......... A23G 4/02; A23G 7/0068; A23G 7/32; A23G 4/00; B65G 15/58; B65G 59/45;
(Continued)

(56) References Cited

U.S. PATENT DOCUMENTS 1,738,103 A   12/1929 Haman
2,807,390 A * 9/1957 Bonebrake ........... A23G 7/0025
                                                        192/28

(Continued)

FOREIGN PATENT DOCUMENTS

CN    201054959    5/2008
CN    10154-9801   10/2009
(Continued)

*Primary Examiner* — Kenneth E. Peterson
*Assistant Examiner* — Nhat Chieu Do
(74) *Attorney, Agent, or Firm* — Cislo & Thomas, LLP

(57) ABSTRACT

A conveying and separating method and a device for separating sheet-shaped objects, for example preliminary chewing-gum products or intermediate chewing-gum products in the form of chewing-gum sheets, into strip-shaped or slab-shaped object sub-units. The conveying and separating method and device for separating sheet-shaped objects preferably separates sub-units one after another from each of the sheet-shaped objects at at least one weakened region on each of the sheet-shaped objects by a conveying and separating device that preferably has a revolving conveyor belt with suction elements that can be activated and deactivated. The suction elements pick up, hold, and convey the sheet-shaped object when the suction element is activated and release the sub-units when the suction element is deactivated.

17 Claims, 4 Drawing Sheets

(51) Int. Cl.
*A23G 7/00* (2006.01)
*B65G 15/58* (2006.01)
*B65G 59/04* (2006.01)
*B65G 59/06* (2006.01)
*A23G 4/00* (2006.01)
*B26F 3/02* (2006.01)

(52) U.S. Cl.
CPC ........... *B65G 15/58* (2013.01); *B65G 59/045* (2013.01); *B65G 59/062* (2013.01); *B26F 3/02* (2013.01); *B65G 2201/0202* (2013.01); *B65G 2201/022* (2013.01); *Y10T 225/336* (2015.04)

(58) Field of Classification Search
CPC .. B65G 59/062; B65G 2201/022; B26D 7/32; B26F 3/02; Y10T 225/336
USPC .... 83/360–372, 358, 102–107; 225/100–101
See application file for complete search history.

(56) References Cited

U.S. PATENT DOCUMENTS

| | | | | |
|---|---|---|---|---|
| 2,822,907 | A * | 2/1958 | Bonebrake | A23G 3/0247 192/125 A |
| 2,931,151 | A | 4/1960 | Simeone et al. | |
| 3,169,428 | A * | 2/1965 | Owen | B07C 5/361 209/564 |
| 4,140,258 | A * | 2/1979 | Gray | B65G 49/067 225/103 |
| 5,297,710 | A * | 3/1994 | Juras | C03B 33/033 225/105 |
| 5,687,641 | A * | 11/1997 | Williamson | A21C 3/022 198/689.1 |
| 2004/0037931 | A1* | 2/2004 | Zimmerman | A21C 15/002 426/293 |
| 2004/0232188 | A1* | 11/2004 | Lisec | B65G 49/064 225/2 |
| 2008/0178748 | A1* | 7/2008 | Groff | A21C 9/086 99/450.2 |
| 2010/0276257 | A1* | 11/2010 | Polman | B65G 17/30 198/803.5 |
| 2014/0137517 | A1 | 5/2014 | Hammacher | |

FOREIGN PATENT DOCUMENTS

| | | |
|---|---|---|
| DE | 19528077 | 2/1997 |
| DE | 10 2011 075 439 | 11/2012 |
| DE | 10 2011 109 541 | 2/2013 |
| EP | 0698452 | 2/1996 |
| EP | 1110882 | 6/2001 |

* cited by examiner

METHOD AND DEVICE FOR SEPARATING SHEET-SHAPED OBJECTS INTO STRIP-SHAPED OR SLAB-SHAPED OBJECT SUB-UNITS

CROSS-REFERENCE TO RELATED APPLICATION

This patent application is the National Stage of International Application No. PCT/EP2011/069,971, filed Nov. 11, 2011, which application is incorporated in its entirety here by this reference.

TECHNICAL FIELD

The invention relates to a method and a device for separating sheet-shaped objects into strip-shaped or slab-shaped object sub-units. In particular, the invention relates to a method of this type and a device of this type in which the sheet-shaped objects and the strip-shaped or slab-shaped object sub-units which are formed from the former are preliminary products or intermediate products of the foodstuff industry, in particular preliminary chewing-gum products or intermediate chewing-gum products.

BACKGROUND OF INVENTION

The invention will be explained below in an exemplary manner by means of chewing gum as the object to be processed and to be conveyed. In as far as chewing gum, chewing-gum strips or strips of chewing gum, or chewing-gum slabs or chewing-gum sheets are mentioned below, this is to be understood only in an exemplary manner. The present invention, apart from chewing gum, also relates to any other type of two-dimensional, strip-shaped or sheet-shaped objects, in particular to objects as preliminary products or intermediate products of the foodstuff industry, which, following suitable further processing and portioning, are suitable for human consumption. For example, these may also be preliminary products or intermediate products of the bakery or confectionery industry and the like. However, two-dimensional, strip-shaped or sheet-shaped products which are not intended for consumption, such as, for example, medical products or pharmaceutical products, such as medical diagnostic strips, blister packages and the like, are also included.

It is an essential feature of all objects of this type that they are manufactured as a two-dimensional, strip-shaped or sheet-shaped or slab-shaped preliminary product or intermediate product in a continuously operating device and thereafter are transferred to a downstream device in which the objects, or the object sub-units formed from the former, are conveyed onward and, in particular, further processed. The latter further-processing device here is, in particular, a device in which individual product portions (e.g. in the present case individual chewing-gum strips which are intended for consumption) are formed from the supplied larger preliminary product or intermediate product (or the object sub-unit, respectively), wherein the individual products formed in this manner are then packed, in particular also packed individually or in groups, in the further-processing device.

In the case of chewing gum, such a further-processing device, or packaging machine, for example, is described in the German patent application 10 2011 075 439. In this chewing-gum packaging machine, initially comparatively large rectangular slabs, in particular strips, from chewing-gum material are provided at the machine entry, which slabs are then introduced into the packaging machine and from which slabs the individual strip-shaped chewing-gum portions intended for consumption are formed in said packaging machine. These individual chewing-gum strips are subsequently packed in the machine, individually and/or in groups. In the case of this and other known chewing-gum packaging machines, the supplied comparatively large rectangular or elongated chewing-gum slabs or chewing-gum strips are provided at the machine entry, stacked in a magazine, from where they are individually removed one after another, and successively introduced into the continuously operating packaging machine. Typically, each of these larger chewing-gum strips may be dimensioned such that subsequently, for example, about 40 individual product strips (chewing-gum strips) intended for consumption are formed from this product slab in the packaging machine, wherein these formed individual chewing-gum strips are subsequently packed and conveyed onward in the machine.

In the case of the known chewing-gum packaging machines, the mentioned larger rectangular or elongate chewing-gum slabs, which are provided at the machine entry, are typically formed as an intermediate product from a larger sheet of chewing-gum material. Here, these larger chewing-gum sheets are typically uniformly divided into a plurality of identical elongated chewing-gum slabs which were mentioned earlier. The larger, sheet-shaped preliminary products of chewing-gum material, i.e. sheets, are, at an earlier stage, typically formed on a rolling mill from a continuous strand or carpet which is made from a dough of chewing-gum material. Subsequent to the rolling mill, weakening regions, in particular scores or perforation lines, which usually run parallel to the conveying direction of the chewing-gum carpet, are formed initially here in the continuous chewing-gum carpet by means of scoring rollers or knife rollers, or other suitable installations. Individual chewing-gum sheets are then severed from the continuous chewing-gum carpet by means of a cross-cutting installation. The chewing-gum sheet formed in this manner is dimensioned and calibrated here such that subsequently an integer multiple number of the elongate chewing-gum slabs, which are to be introduced into the downstream packaging machine, results, wherein these individual, elongate chewing-gum slabs are formed from the chewing-gum sheet by means of the weakening regions or scores or perforation lines which are present in the chewing-gum sheet. The afore-described process of manufacturing the scored chewing-gum sheet as a preliminary product or an intermediate product is referred to in the industry as a "rolling-and-scoring process".

The elongate chewing-gum slabs which are provided at the entry of the processing machine or packaging machine are divided in an analogous manner in the machine into the smaller chewing-gum strips, as individual portions intended for consumption. The larger chewing-gum slabs, as preliminary products, here are again provided with regularly arranged weakening regions or scores or perforation lines, along which the individual strips, as final products, are then severed in each case in the machine. This operation is also referred to in the industry as a "rolling-and-scoring process".

SUMMARY OF INVENTION

The invention relates, in particular, to the formation of the elongate, larger chewing-gum slabs, which are to be provided at the entry of a chewing-gum packaging machine, from the chewing-gum sheet which is provided at the exit of the rolling mill. To this end, it is usual in the prior art for the elongate chewing-gum slabs to be manually snapped off by an operator along the weakening region (or the score or the perforation line) from the larger chewing-gum sheet. Here, the operator typically takes a stack of a plurality of identical chewing-gum sheets and then successively snaps off therefrom in each case a corresponding stack of the elongate chewing-gum slabs. To this end, therefore, the operator has to perform an always identical folding motion or pivoting motion in order to snap off the individual or stacked slabs from the chewing-gum sheet along the weakening region. The chewing-gum strips or slabs formed in this manner are then manually inserted by the operator into a magazine at the entry of the chewing-gum further-processing and packaging machine.

In particular, the folding motion or pivoting motion which has to be performed by the operator for snapping off the slabs from the sheet is tiring and, in the case of sustained performance and persistent repetition, also detrimental to health in the long run. This all the more so, since the production of the chewing-gum sheets by means of the rolling mill and the take-up of the formed chewing-gum slabs by the packaging machine are continuously running processes which cannot readily and/or at short notice be interrupted and stopped. Thus, chewing-gum sheets, from which the individual slabs which are continuously taken up by the packaging machine have to be formed, are steadily being supplied, such that the operator performing the afore-described formation and transfer of the slabs essentially therefore cannot allow any interruption in these operating steps, in any case not as long as the upstream and downstream production machines and processing machines are operational. Therefore, these manual operating steps represent a weak spot having a potential for errors in the entire process, which otherwise essentially consists of continuously and automatically operating machines.

Proceeding from these disadvantages and problems of the prior art, the invention is based on the object of providing an improved method, or an improved device, for the formation of individual strip-shaped or slab-shaped object sub-units, in particular individual chewing-gum slabs, as intermediate products from larger sheet-shaped objects, in particular larger chewing-gum sheets, wherein, in the case of this method and this device, the afore-described disadvantages and problems existing in the prior art should not arise. In particular, the method according to the invention and the device according to the invention are intended to reduce or completely avoid the weak spots which are caused by the manual operating steps in the entire process of manufacturing and packaging chewing gum.

This object is achieved according to the invention by a method and a device for separating sheet-shaped objects into strip-shaped or slab-shaped object sub-units, having the following method steps and device features: providing the sheet-shaped objects, wherein each sheet-shaped object has at least one weakening region; successively separating individual strip-shaped or slab-shaped object sub-units one after another from the provided sheet-shaped objects, wherein separating takes place on the weakening regions of the sheet-shaped objects by means of a conveying and separating device; and onward conveying of the individual, formed strip-shaped or slab-shaped object sub-units.

On account of the method according to the invention and the device according to the invention, an automatic division by a machine of the provided larger object sheet into a plurality of strips or smaller slabs of the object material is, therefore, possible. On account thereof, corresponding operating steps which have to be performed manually are avoided.

In one preferred embodiment of the invention, the provided sheet-shaped objects are preliminary chewing-gum products or intermediate chewing-gum products in the form of chewing-gum sheets, and the strip-shaped or slab-shaped object sub-units which are formed from the former, by way of the device according to the invention and the method according to the invention, are preliminary chewing-gum products or intermediate chewing-gum products in the form of elongate chewing-gum slabs or smaller chewing-gum slabs. The latter may then be fed in to a further-processing and/or packaging machine in which smaller individual strip-shaped chewing-gum portions which are destined for consumption are manufactured from the formed chewing-gum slabs. In this machine, the individual strip-shaped chewing-gum portions are then subsequently packed, individually and/or in groups, in packaging material.

In the entire process sequence of manufacturing and packaging chewing-gum strips, the method according to the invention and the device according to the invention are, therefore, placed between the exit of a rolling mill, in which the larger sheets of chewing-gum material are formed, and the entry of a further-processing and/or packaging machine, in which the individual chewing-gum slabs formed from the chewing-gum sheet are further processed and, in particular, divided into small individual chewing-gum portions and packed.

According to one preferred embodiment of the invention, the sheet-shaped object (chewing-gum sheet) has a rectangular shape, wherein the weakening regions existing therein have a plurality of scores or perforation lines which run parallel to one another and parallel to one of the edges and substantially across the entire width of the sheet-shaped object in such a manner in the object that an integer number of strip-shaped or slab-shaped object sub-units (chewing-gum slabs) can be formed from the sheet-shaped object.

According to one further preferred embodiment, the method according to the invention and the device according to the invention have the following further method steps and device features: picking up and holding in a force-fitting and form-fitting manner, in each case individually, one after another, the sheet-shaped objects, by means of suitable installations, on the conveying and separating device; conveying the sheet-shaped objects, by means of suitable installations, in the plane of their extent and in a direction which is perpendicular to the run of the weakening regions or to the scores or to the perforation lines; severing, by means of suitable installations, in each case the foremost part of the sheet-shaped object, in the conveying direction of the sheet-shaped object, from said object at the in each case foremost weakening region or the in each case foremost score or perforation line, for forming the strip-shaped or slab-shaped object sub-unit; and depositing the formed strip-shaped or slab-shaped object sub-unit by means of suitable installations.

According to one further preferred embodiment of the invention, the conveying and separating device has a conveying means which revolves in a belt-like manner and which is provided with suction elements, wherein the suction effect of the suction elements can be activated and deactivated, wherein the suction elements, by means of their suction effect, pick up and hold the sheet-shaped object and entrain the same in the conveying direction of the conveying means, and wherein the suction elements release the object when the suction effect is deactivated. The suction elements which hold the sheet-shaped object here are arranged in such a manner that in each case at least one suction element engages in each case with the sheet-shaped object between two adjacent weakening regions or scores or perforations lines, wherein in each case the foremost part of the sheet-shaped object, in the conveying direction of the sheet-shaped object, which forms the strip-shaped or slab-shaped object sub-unit is severed from said sheet-shaped object in that, on account of the revolving motion of the conveying means, the suction element which is assigned to said part is moved, in particular pivoted, out of the conveying plane of the sheet-shaped object, on account of which said part of the sheet-shaped object, ahead of the in each case foremost weakening region or the in each case foremost score or perforation line, is moved out of the conveying plane, and wherein the formed strip-shaped or slab-shaped object sub-unit is deposited by the conveying and separating device in that the suction effect of the suction element which is assigned to the severed object sub-unit is deactivated. The suction elements here are preferably arranged in such a manner that a plurality of suction elements engage with the sheet-shaped object where said suction elements are substantially beside one another and perpendicular to the conveying direction of the conveying means and in each case between two adjacent weakening regions or scores or perforation lines and substantially across the entire width of said sheet-shaped object.

In one further embodiment of the invention, the devices for onward conveying of the individual strip-shaped or slab-shaped object sub-units formed by the conveying and separating device can have an assembling installation, or are upstream thereof, in which a plurality of strip-shaped or slab-shaped object sub-units, in particular lying on top of one another in the form of an aligned stack, are stored temporarily and from which they are retrieved for further processing.

In yet one further embodiment of the invention, the properties, in particular the material consistency and/or the dimensions, of the formed strip-shaped or slab-shaped object sub-units can be detected by means of sensor installations, wherein conveying installations which are coupled to the sensor installations via suitable controlling installations are provided, by way of which those object sub-units of which the detected properties do not conform to predefined values are discharged from the entire conveying process, such that these defective object sub-units are not transferred to, in particular, the assembling installation and/or to further-processing installations (e.g. a packaging machine) subsequent to the latter.

The sheet-shaped objects may be fed in individually and successively, one after another, to the conveying and separating device. The sheet-shaped objects may preferably be provided ahead of the conveying and separating device, but also in the form of a stack of a plurality of identical sheet-shaped objects, wherein the conveying and separating device then receives the sheet-shaped objects from the stack in each case individually, one after another.

DETAILED DESCRIPTION OF THE INVENTION

Figure 1:
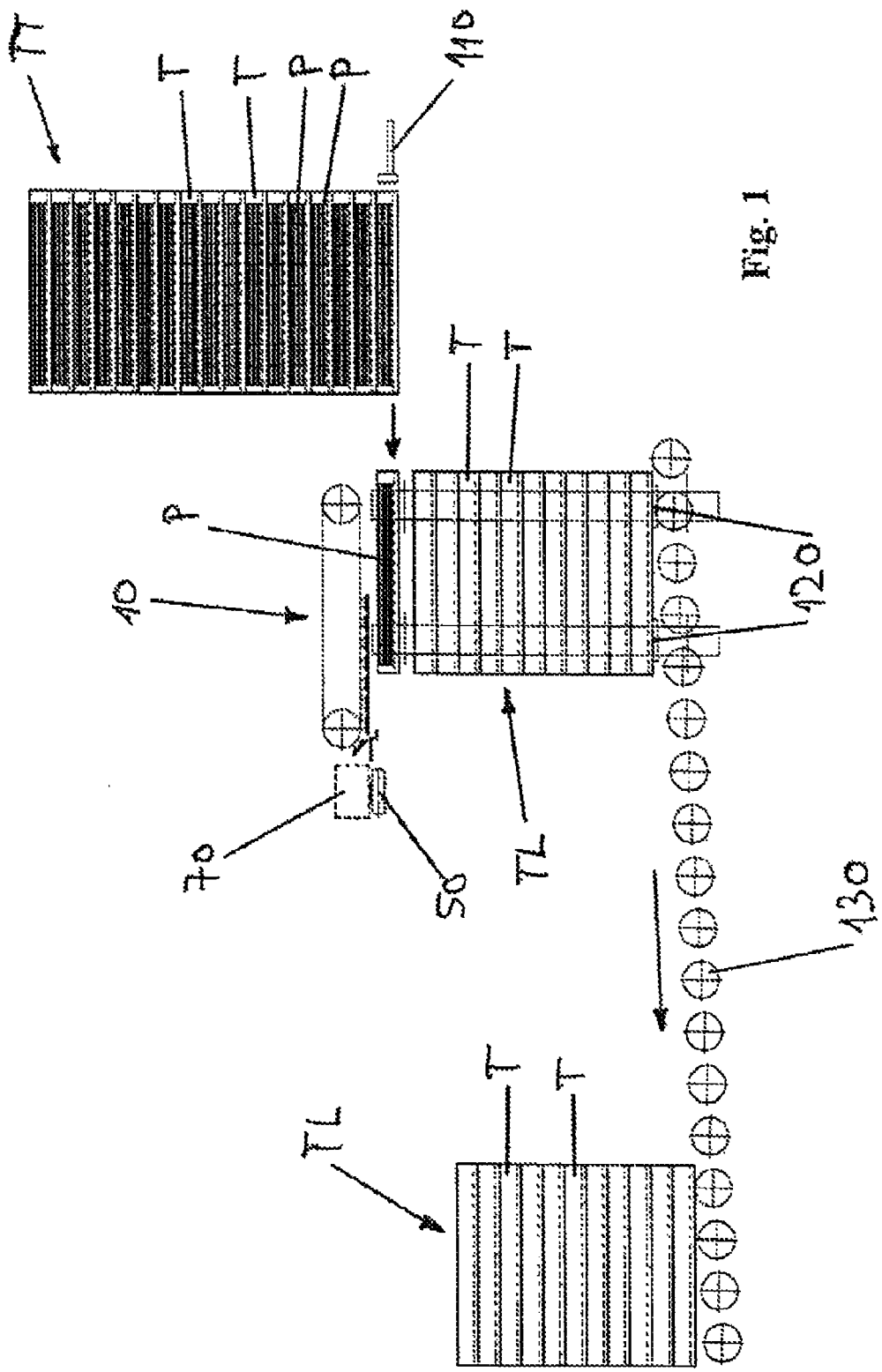
FIG. 1 shows the separating device according to the invention, in a side view.

FIG. 1, in a side view, shows a device for separating sheet-shaped objects, in the present case, in particular, chewing-gum sheets, into strip-shaped or slap-shaped object sub-units, in the present case, in particular, chewing-gum slabs. This device comprises, in particular, a conveying and separating device 10, by means of which the individual chewing-gum slabs S are severed successively, one after another, from the provided chewing-gum sheets P. The conveying and separating device 10 is illustrated in an enlarged form in FIGS. 2 and 3. As described above, the chewing-gum sheets P are manufactured in a rolling mill (not illustrated) and then provided individually or in stacks at the conveying and separating device 10. The chewing-gum sheets P are provided, in particular, in stacks, wherein, for example, a stack of a plurality of chewing-gum sheets P is arranged in each case on a tray T. The chewing-gum sheets P are then fed in, in each case individually, one after another, from the stack to the conveying and separating device 10.

As is illustrated in FIG. 1, in one embodiment, initially a plurality of trays T may be provided as a stack TT ahead of the conveying and separating device 10, wherein each tray T holds a stack of a plurality of chewing-gum sheets P. By means of a slide 110, for example the lowermost filled tray T is then ejected from the stack TT and provided under the conveying and separating device 10. In this position of the tray T, the individual chewing-gum sheets P are then transferred, one after another, to the conveying means 20 of the conveying and separating device 10. To this end, for example, a lifting installation 120, which holds and, if applicable, raises the provided tray T, may be provided, so that the individual chewing-gum sheet P which is in each case the uppermost in the stack can be retrieved from the tray T by the conveying and separating device 10, or transferred to the conveying and separating device 10, respectively. The lifting installation 120 may, furthermore, serve for depositing the tray T toward the bottom, as soon as the last chewing-gum sheet P has been retrieved from said tray T. In this manner, a stack TL of empty trays T, which is successively moved downward by the lifting installation 120, can be formed under the conveying and separating device 10, so that in each case a new tray T filled with chewing-gum sheets P can be inserted above this stack TL by means of the slide 110, under the conveying and separating device 10 or into the region thereof, and is on standby for the retrieval of the chewing-gum sheets P by the conveying and separating device 10. As soon as a specific number of emptied trays T is present in the stack TL, this stack TL of empty trays T is ejected from the position below the conveying and separating device 10 and/or conveyed away, for example, by means of a roller track 130. The empty trays T are then available for renewed filling with chewing-gum sheets P.

Figure 4:
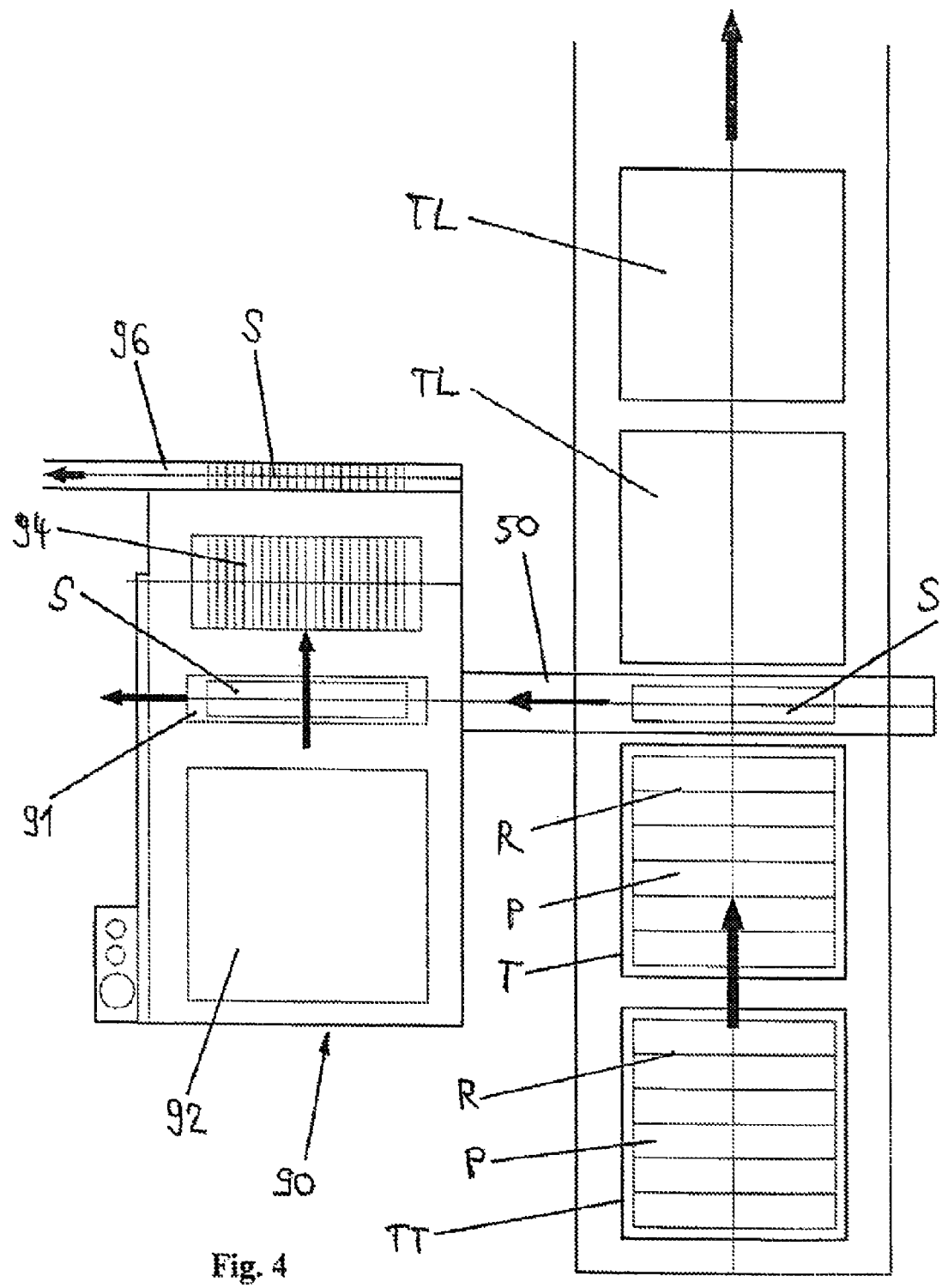
FIG. 4 shows details of the separating device according to the invention, in a view from above.

FIG. 4 shows a view from above of parts of the entire plant, whereby, in particular, the supply and provision of the trays T which are filled with the chewing-gum sheets P ahead of and below the conveying and separating device 10

(not illustrated in this figure) is visible here. In FIG. 4, the stack TT of the filled trays, from which in each case one tray T is ejected (in the direction of the illustrated arrow) into the region of the conveying and separating device 10, can be seen at the extreme bottom right (tray T in the retrieval position). Subsequently, the completely emptied trays T, in particular as a stack TL of empty trays, are then ejected from the region of the conveying and separating device 10 (further upward toward the right, in FIG. 4).

As can further be seen in FIG. 4, the chewing-gum sheets P, which have been supplied and are lying in the trays T, are provided with weakening regions or scores or perforation lines R which are required for severing the individual chewing-gum slabs S from the chewing-gum sheet P, as will be described further below. As shown in FIG. 4, the scores R in the chewing-gum sheet P are arranged parallel to one another, and at identical spacing from one another, and perpendicularly to the direction of the feed (cf. direction of the illustrated arrow) of the tray T to the conveying and separating device 10. In the example shown in FIG. 4, six chewing-gum slabs S can, therefore, be formed from one chewing-gum sheet P. However, it is self-evident that any other suitable number of chewing-gum slabs S may also be provided.

Figure 2:
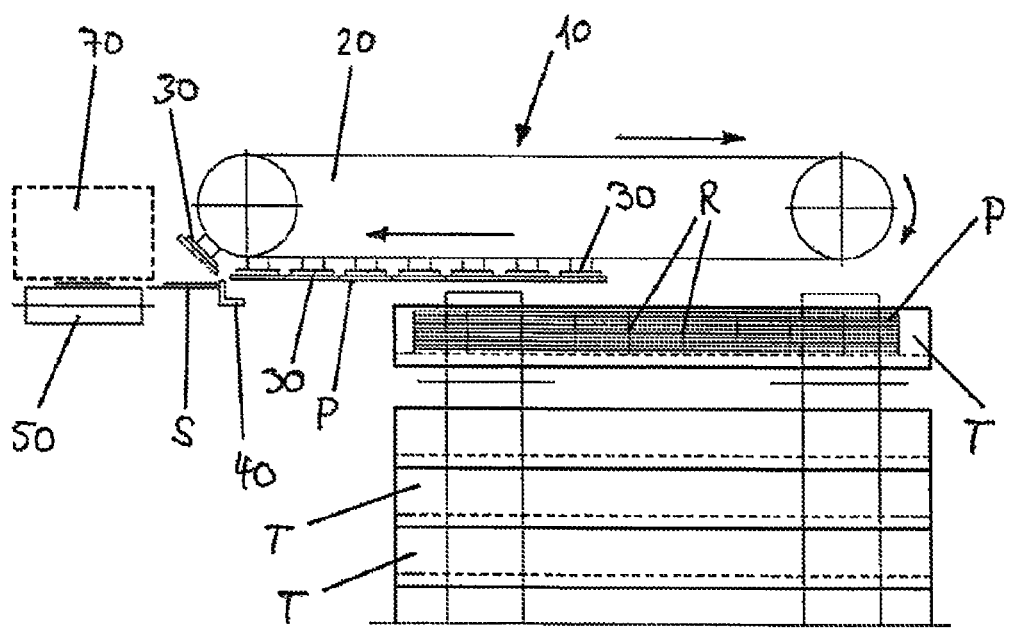
FIG. 2 shows the separating device according to the invention as an enlarged detail of FIG. 1, in a view from the side.

As can be seen, in particular, from FIGS. 1 and 2, conveying means 50, for discharging and onward conveying the individual chewing-gum slabs S formed from the chewing-gum sheets P, are immediately downstream of the conveying and separating device 10. These conveying means 50 will be described in more detail below, with reference to FIGS. 4 and 5.

Figure 3:
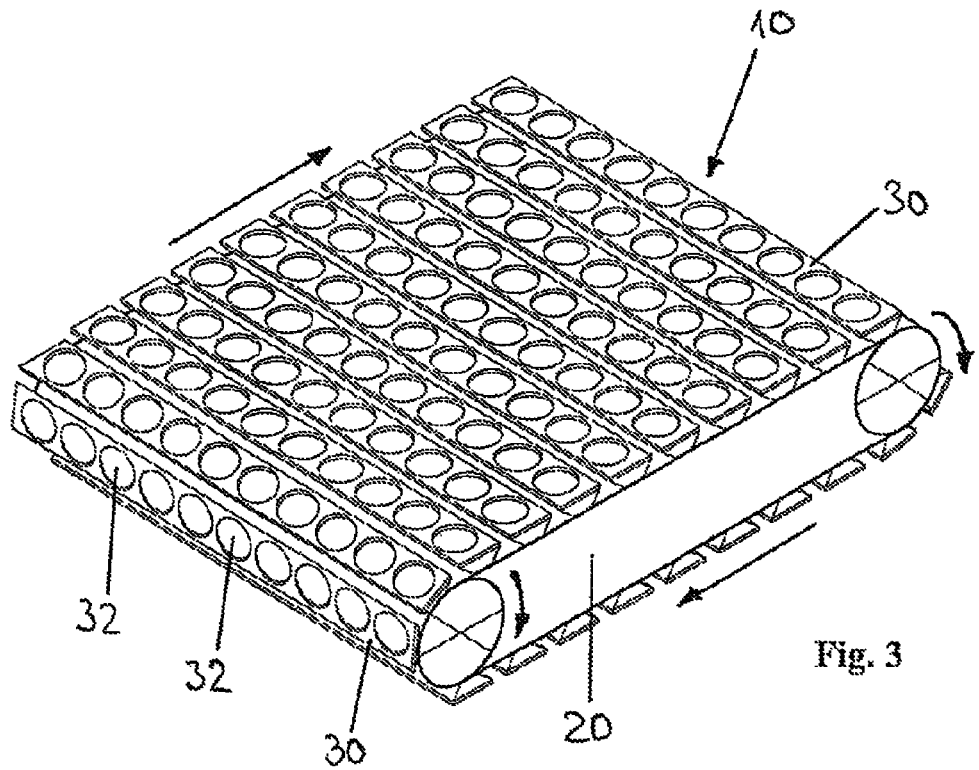
FIG. 3 shows the conveying and separating device of the separating device according to the invention, in a perspective view.

It is evident, in particular, from FIGS. 2 and 3 that the conveying and separating device 10 is composed of a conveying means 20 which revolves in a belt-like manner and on which suction elements 30 are arranged at a regular spacing. The suction effect of the suction elements 30 may be caused, for example, by negative pressure which is generated in suction heads or vacuum chambers 32 on the suction elements 30, wherein said negative pressure, and thus the suction effect of the suction elements 30, 32, may be activated and deactivated. The suction elements 30, 32, by means of their suction effect, pick up the chewing-gum sheet P from the provided tray T and hold the latter in a force-fitting and form-fitting manner. On account of the revolving motion of the conveying means or conveyor belt 20, the individual chewing-gum sheet P which has been picked up in this manner is then entrained and conveyed onward. Therefore, the chewing-gum sheet P is conveyed by the conveyor belt 20 in particular in the plane of the extent of the former and in a direction which is perpendicular to the run of the scores R which are provided in the chewing-gum sheet P.

As is further shown in FIG. 2, the suction elements 30 are arranged on the conveyor belt 20 in such a manner that in each case at least one suction element 30 engages in each case with the chewing-gum sheet P between two adjacent scores R, i.e. that in each case at least one suction element 30 is provided for each chewing-gum slab S which is to be formed from the chewing-gum sheet P. The suction elements 30 here may also be implemented, in particular, such that a plurality of suction elements or suction heads or vacuum chambers 32 are arranged beside one another, i.e. perpendicularly to the conveying directing of the conveyor belt 20, and engage with the chewing-gum sheet P in each case between two adjacent scores R of said chewing-gum sheet P and substantially across the entire width of the chewing-gum sheet P (cf. FIG. 3). One row of the plurality of vacuum chambers 32 (in FIG. 3) which are arranged beside one another in the transversely running suction element 30, therefore, substantially corresponds to the length and width of the individual chewing-gum slab S which is to be formed from the chewing-gum sheet P.

The chewing-gum slabs S are then severed from the chewing-gum sheet P in such a manner that, on account of the revolving motion of the conveyor belt 20, the suction elements 30 are moved or pivoted out from the motion plane or conveying plane of the chewing-gum sheet P. In the process, that part of the chewing-gum sheet P which, in the conveying direction, is at the very front is moved out or pivoted out from the conveying plane of the chewing-gum sheet P by way of the pivoting motion of the suction element 30, which is assigned to said chewing-gum sheet P, at or ahead of the score R which is in each case, in the conveying direction, foremost, as can be identified in FIG. 2 at the left end of the revolving conveyor belt 20. This foremost part of the chewing-gum sheet P, which is held by the respective suction element 30, is, therefore, snapped off from the chewing-gum sheet P at the score R by this pivoting motion. This severed part of the chewing-gum sheet P then forms the desired individual chewing-gum slab S.

Once the chewing-gum slab S has been severed in this manner from the remainder of the chewing-gum sheet P, the suction effect of the suction element 30, which is assigned to the formed chewing-gum slab S, is deactivated, on account of which this suction element 30 then releases the chewing-gum slab S. On account thereof, the individual, formed chewing-gum slab S is offloaded by the conveying and separating device 10 and, in particular, transferred to a downstream installation for onward conveying of the chewing-gum slab S. The formed chewing-gum slab S here may be transferred, for example, by means of a slide and/or a rake-type conveying means 40 to a downstream conveying means 50 (e.g. a further revolving conveyor belt), by way of which the chewing-gum slab S is taken off and conveyed onward.

As is shown by FIG. 4, the formed chewing-gum slab S, by means of the conveyor belt 50, is then transferred to an assembling installation (magazine) 91 in which the supplied chewing-gum slabs S are stacked and temporarily stored in this manner. The chewing-gum slabs S are subsequently individually retrieved, in particular individually ejected, one after another, by means of a slab slide 92 from said magazine 91. The chewing-gum slabs S may then be fed in to a scoring roller or a knife roller 94 which, in turn, produces weakening regions or scores or perforation lines in the chewing-gum slab S, such that, after having passed through the scoring roller 94, a chewing-gum slab S which is provided with parallel, regularly spaced scores is presented. In this chewing-gum slab S, the individual portions which are separated by the scores in each case correspond to an individual portion of chewing gum which is to be ultimately formed and which is destined for consumption. The chewing-gum slab S, which has been scored in this manner, is then fed in via a further conveying means (conveyor belt) 96 to a chewing-gum packaging machine, in which the individual chewing-gum strips are initially singularized from the chewing-gum slab S and said individual portion strips are subsequently packed individually and/or in groups. The combination of the magazine 91 with the slide 92 and the knife roller or scoring roller 94, which is illustrated in FIG. 4, is typically referred to in the industry as a cold-scoring unit 90.

It may be further provided in one embodiment of the entire plant that the individual chewing-gum slab S formed from the chewing-gum sheet P is subjected to a qualitycontrol process in which specific properties, for example the material consistency and/or the dimensions of the chewing-gum slab S, are checked, wherein those chewing-gum slabs S of which the detected properties and/or quality features do not conform to predefined values are discharged from the entire conveying process. On account thereof, it is avoided that chewing-gum slabs S which are defective or of inferior quality are transferred to the downstream further-processing and/or packaging machine.

For the purpose of this inspection or check of quality of the chewing-gum slab S, a sensor installation 70, which detects and checks the relevant properties and features of the chewing-gum slab, may be provided in the conveying path, downstream of the conveying and separating installation 10. The sensor installation 70 here may have, for example, an X-ray scanner which detects both external and internal defects and irregularities of the chewing-gum slab, such as, for example, undesirable inclusions of foreign matter and the like. In the event of the sensor installations 70 being formed by a camera, essentially external defects and the dimensional adherence of the chewing-gum slab S may be checked as a result. It is self-evident that also other suitable sensor installations may be provided.

Figure 5:
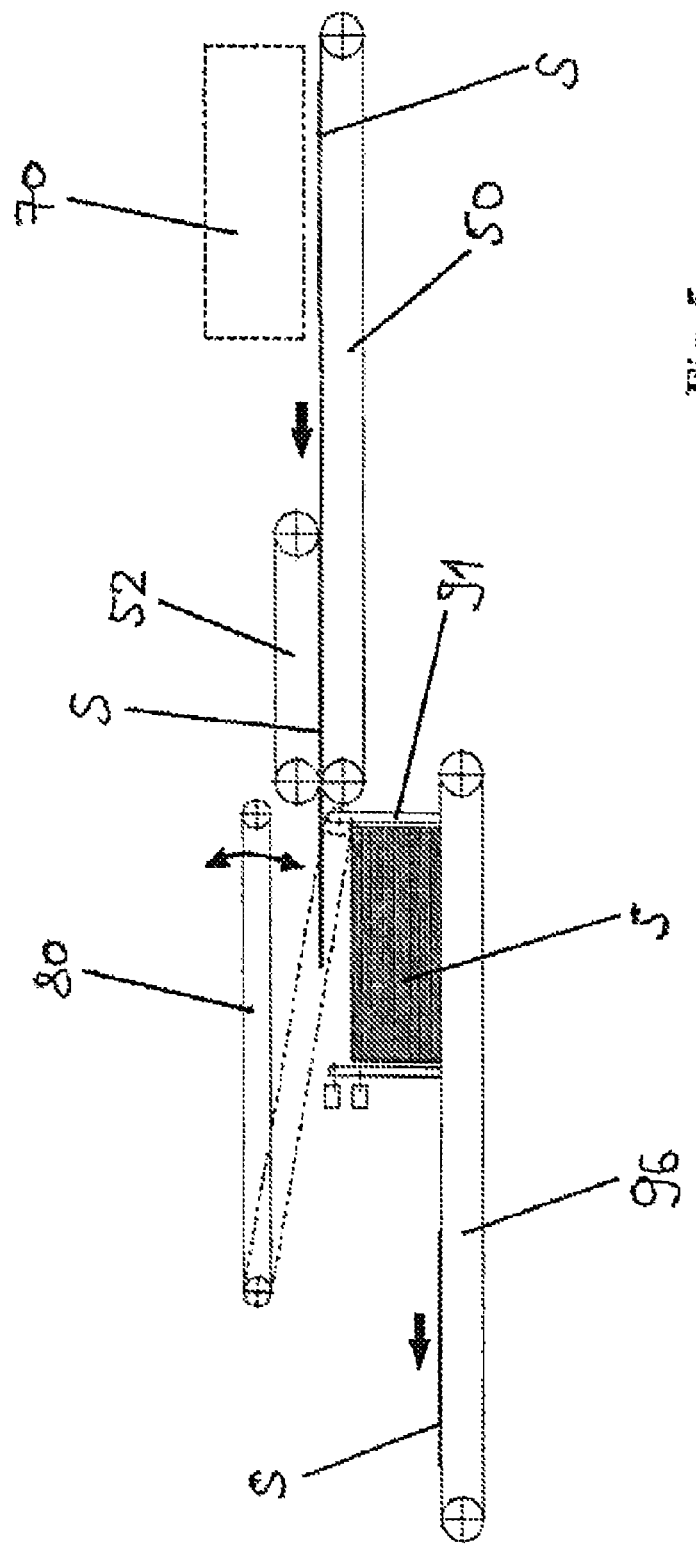
FIG. 5 shows details of the separating device according to the invention, in a view from the side.

In the event that the sensor installations 70 determine that the chewing-gum slab S is defective, the respective chewing-gum slab S may be discharged from the conveying process by means of suitable conveying installations. These discharge-conveying installations 80 are coupled to the sensor installations 70 by means of suitable controlling installations (not shown). As shown in FIG. 5, the conveying installations 80 for discharging the defective chewing-gum strips S may be formed, for example, by a pivotable conveyor belt which is subsequent to the conveyor belt 50 which is downstream of the conveying and separating installation 10. In the event that the sensor installations 70, for example in the region of the conveyor belt 50, determine that the respective chewing-gum slab S conforms in terms of quality, said chewing-gum slab S is transferred from the conveyor belt 50 into the assembling magazine 91 and, therefore, provided for further processing. The "good" chewing-gum slabs, for example by means of a further conveying means (conveyor belt) 96, are then transferred to the downstream further-processing and/or packaging machine. As has already been described above, the chewing-gum slabs S here may be ejected from the magazine 91 and transferred to the conveyor belt 96 by means of a slide 92, for example.

However, should the sensor installations 70 determine that the respective chewing-gum slab S is defective and, therefore, preferably should not be transferred to the further-processing and/or packaging machine, the conveyor belt 80, by means of suitable controlling installations, if applicable, in the region ahead of the assembling magazine 91 in the conveying direction, is pivoted into the region of the exit of the conveyor belt 50 (cf. FIG. 5). The defective chewing-gum slab S which is supplied by the conveyor belt 50 is then transferred to the conveyor belt 80 and conveyed away by the latter and, thereby, in particular discharged from the entire process. In the illustration of FIG. 4, discharging the defective chewing-gum slab S takes place toward the left in the direction of the horizontal arrow which is on the left side beside the magazine 91.

As is shown in FIGS. 2, 4 and 5, subsequent to the conveying and separating installation 10, the chewing-gum slab S is conveyed onward in its longitudinal direction, in particular lying on the upper side of the conveyor belt 50. Optionally, the conveyor belt 50 may be combined with another conveyor belt 52 (what is referred to as a top-runner), which is arranged above the former and which acquires the chewing-gum slab S from above and, together with the conveyor belt 50, conveys it onward. On account of this interaction of the conveyor belts 50, 52 which are arranged above and below the conveying track of the chewing-gum slab S, inter alia a dimensionally accurate position and/or a defined conveying speed (and/or, if applicable, also a defined acceleration) of the chewing-gum slab S is accomplished, such that the latter is fed in to the magazine 91 in a defined manner.

LIST OF REFERENCE SIGNS

P Sheet-shaped object, chewing-gum sheet, sheet
S Strip-shaped or slab-shaped object sub-unit, chewing-gum slab, slab
R Weakening region, score, perforation line
T Tray
TT Stack of filled trays
TL Stack of empty trays
10 Conveying and separating installation
20 Conveying means, conveyor belt
30 Suction element
32 Suction element, vacuum chamber, suction head
40 Slide, rake-type conveying means
50 Conveying means, conveyor belt
52 Conveyor belt, top-runner
70 Sensor installations, scanner
80 Discharge-conveying installations, conveyor belt
90 Cold-scoring unit
91 Assembling installation, magazine
92 Slide
94 Scoring roller, knife roller
96 Conveying means, conveyor belt
110 Slide (for tray T)
120 Lifting installation (for trays T)
130 Roller track

The invention claimed is:

1. A method for separating sheets into sub-units the method comprising the following steps:
   providing a plurality of sheets, wherein each sheet of the plurality of sheets defines a conveying plane and has at least one weakened region, a conveying direction, a foremost part in the conveying direction, and a foremost weakened region in the conveying direction;
   successively separating sub-units one after another from each sheet of the plurality of the sheets at the at least one weakened region by a revolving conveyor belt having suction elements that can be activated and deactivated, wherein successively separating sub-units comprises the following further steps:
   picking up and holding each sheet of the plurality of sheets, individually and one after another;
   conveying each sheet of the plurality of sheets in the conveying plane and in a direction perpendicular to the at least one weakened region; and
   severing the foremost part of each sheet of the plurality of sheets at the foremost weakened region of each respective sheet to form each sub-unit; and
   depositing each sub-unit,
   wherein the picking up and holding step and the conveying step are performed by the suction elements arranged on the revolving conveyor belt,
   wherein, when the suction elements are activated, the suction elements pick up, hold, and convey each sheet of the plurality of sheets, wherein at least one suction element is between two weakened regions, the two weakened regions being adjacent to one another on the respective sheet, and when deactivated, the suction elements release and deposit each sub-unit, wherein a portion of the revolving conveyor belt and at least one suction element of the suction elements holding the foremost part of the respective sheet move out of the conveying plane, causing the foremost part of the respective sheet, ahead of the foremost weakened region, to move out of the conveying plane, severing the foremost part of the respective sheet and forming each sub-unit; and onward conveying of the sub-unit.

2. The method as claimed in claim 1, characterized in that each sheet of the plurality of sheets has a rectangular shape and a width, wherein a plurality of weakened regions is defined by a plurality of scores, each of the plurality of scores running parallel to one another and also parallel to an edge of the respective sheet, and each of the plurality of scores running across the width of the respective sheet, in such a manner that an integer number of sub-units are formed from each sheet of the plurality of the sheets.

3. The method as claimed in claim 1, further characterized in that the sub-units are transferred from the revolving conveyor belt to an assembling installation in which the sub-units are stored temporarily and from which the sub-units are retrieved for further processing.

4. The method as claimed in claim 1, further characterized by the steps of:

detecting specified properties of the sub-units by sensor installations, the specified properties being a material consistency or a dimension, and discharging from the onward conveying the sub-units whose detected properties do not conform to predefined values.

5. The method as claimed in claim 1, wherein each sheet of the plurality of sheets having the conveying direction and each sheet of the plurality of sheets, in the conveying direction, is provided in a stack of identical sheets by the revolving conveyor belt, and in that the revolving conveyor belt receives each sheet of the plurality of sheets from the stack individually, one after another.

6. The method as claimed in claim 1, further characterized in that each sheet of the plurality of sheets and the sub-units that are formed from the sheet are preliminary products or intermediate products of a foodstuff industry, selected from the group consisting of preliminary chewing-gum products and intermediate chewing-gum products.

7. The method as claimed in claim 6, further characterized in that each sheet of the plurality of sheets is a chewing-gum sheet and the sub-units that are formed from the chewing-gum sheet are chewing-gum slabs, wherein individual strips of chewing-gum portions which are destined for consumption are subsequently manufactured from the chewing-gum slabs, and wherein the individual strips of chewing-gum portions are subsequently packed individually or in groups.

8. A system for separating sheets into sub-units, the system comprising:

a plurality of sheets;

devices for providing the plurality of sheets, wherein each sheet of the plurality of sheets defines a conveying plane and has at least one weakened region, a conveying direction, a foremost part in the conveying direction, and a foremost weakened region in the conveying direction;

a revolving conveyor belt having suction elements that can be activated and deactivated, wherein when activated, the suction elements pick up and hold, individually and one after another, each sheet of the plurality of sheets and convey each sheet in the conveying direction and in a direction perpendicular to at least one weakened region, wherein at least one suction element is between two weakened regions adjacent to one another on the respective sheet, and wherein a portion of the revolving conveyor belt and at least one suction element of the suction elements holding the foremost part of the respective sheet move out of the conveying plane, causing the foremost part of the respective sheet, ahead of the foremost weakened region, to move out of the conveying plane, severing the foremost part of the respective sheet and forming each sub-unit, such that when deactivated, the suction elements release and deposit each sub-unit; and onward conveying devices for onward conveying of the sub-units.

9. The system as claimed in claim 8, further characterized in that each sheet of the plurality of sheets has a rectangular shape and a width, wherein the at least one weakened region has a plurality of scores, each of the plurality of scores running parallel to one another and also parallel to an edge of the respective sheet of the plurality of the sheets, and each of the plurality of scores running across the width of the respective sheet of the plurality of sheets, in such a manner that an integer number of sub-units are formed from each sheet of the plurality of sheets.

10. The system as claimed in claim 8, further characterized in that the suction elements are arranged such that a plurality of suction elements engage with each sheet of the plurality of the sheets, the suction elements being beside one another and perpendicular to the conveying direction, between two adjacent weakened regions, and across the width of each sheet of the plurality of the sheets.

11. The system as claimed in claim 8, further characterized in that the onward conveying devices have an assembling installation for temporary storage, prior to further processing, of the sub-units.

12. The system as claimed in claim 11, further characterized in that, in the assembling installation, the sub-units lie on top of one another in an aligned stack.

13. The system as claimed in claim 8, further characterized in that the onward conveying devices having the following further features:

sensor installations which detect specified properties of the sub-units, the specified properties being a material consistency or a dimension;

conveying installations for discharging from the onward conveying the sub-units whose detected properties do not conform to predefined values; and controlling installations which are coupled to the sensor installations and the conveying installations.

14. The system as claimed in claim 8, wherein each of the plurality of sheets is further characterized in that the devices for providing each sheet in the conveying direction ahead of the revolving conveyor belt have installations for providing each of the plurality of sheets in a stack of identical sheets, wherein the revolving conveyor belt receives each of the plurality of sheets from the stack individually, one after another.

15. The system as claimed in claim 8, further characterized in that each sheet of the plurality of sheets and the sub-units which are formed from each sheet are preliminary products or intermediate products of a foodstuff industry, selected from the group consisting of preliminary chewing-gum products and intermediate chewing-gum products.

16. The system as claimed in claim 15, further characterized in that each sheet of the plurality of sheets is a chewing-gum sheet and the sub-units which are formed from the chewing-gum sheet are chewing-gum slabs, wherein individual strip-shaped chewing-gum portions which are destined for consumption are subsequently manufactured from the chewing-gum slabs, and wherein the individual strip-shaped chewing-gum portions are subsequently packed individually or in groups.

17. A system for separating sheets into sub-units, the system comprising:
- a plurality of sheets;
- devices for providing the plurality of sheets, and installations for providing the plurality of sheets in a stack of identical sheets, wherein each sheet of the plurality of sheets has:
  - a rectangular shape and a width;
  - at least two adjacent weakened regions, each defining a plane of extent of the sheet, such that each weakened region of the at least two adjacent weakened regions:
    - has a plurality of scores that are parallel to one another and to an edge of the sheet; and
    - run across the width of the sheet in such a manner that an integer number of sub-units are formed from the sheet; and
  - a conveying direction, a foremost part in the conveying direction, and a foremost weakened region in the conveying direction;
- a revolving conveyor belt having a plurality of suction elements, wherein:
  - when the plurality of suction elements is activated, the plurality of suction elements engages one sheet of the plurality of sheets,
  - one suction element of the plurality of suction elements holding the foremost part of the respective sheet is configured to pivot out of a conveying plane when a portion of the revolving conveyor belt moves out of the conveying plane, causing the foremost part of the respective sheet, ahead of the foremost weakened region, to be moved out of the conveying plane, severing the respective sheet and forming a severed sub-unit,
  - wherein the severed sub-unit is deposited by the revolving conveyor belt by deactivating the suction element holding the foremost part of the respective sheet,
  - wherein each suction element of the plurality of suction elements are beside one another and perpendicular to the conveying direction, with at least one suction element between two adjacent weakened regions, and the plurality of suction elements run across the width of the sheet, and
  - wherein the separating takes place at one of the two adjacent weakened regions; and
- onward conveying devices for the onward conveying of the severed sub-units, formed by the revolving conveyor belt, the onward conveying devices comprising:
  - an assembling installation for temporary storage, prior to further processing, of the sub-units that lie on top of one another in an aligned stack;
  - sensor installations which detect specified properties of the severed sub-units, the specified properties being a material consistency or a dimension;
  - conveying installations for discharging from the onward conveying the sub-units whose detected properties do not conform to predefined values; and
  - controlling installations which are coupled to the sensor installations and the conveying installations,
- wherein the sheets are chewing-gum sheets and the sub-units which are formed from the chewing-gum sheets are chewing-gum slabs, wherein individual strips of chewing-gum portions which are destined for consumption are subsequently manufactured from the chewing-gum slabs, and wherein the individual strips of chewing-gum portions are subsequently packed individually or in groups.

* * * * *